United States Patent [19]
Kobayashi

[11] Patent Number: 5,378,887
[45] Date of Patent: Jan. 3, 1995

[54] NON-CONTACT TYPE IC CARD

[75] Inventor: Yoshinori Kobayashi, Tokyo, Japan

[73] Assignee: Kyodo Printing Co., Ltd., Tokyo, Japan

[21] Appl. No.: 961,882

[22] PCT Filed: May 21, 1992

[86] PCT No.: PCT/JP92/00653
§ 371 Date: Jan. 14, 1993
§ 102(e) Date: Jan. 14, 1993

[87] PCT Pub. No.: WO92/21104
PCT Pub. Date: Nov. 26, 1992

[30] Foreign Application Priority Data
May 22, 1991 [JP] Japan ................. 3-146760
Jun. 14, 1991 [JP] Japan ................. 3-169169

[51] Int. Cl.⁵ .................................... G06K 19/06
[52] U.S. Cl. .................................................. 235/492
[58] Field of Search ............... 235/449, 379, 380, 382, 235/492, 441

[56] References Cited
U.S. PATENT DOCUMENTS

| | | | |
|---|---|---|---|
| 4,841,131 | 6/1989 | Iijima | 235/380 |
| 4,962,485 | 10/1990 | Kato et al. | 365/229 |
| 5,157,247 | 10/1992 | Takahira | 235/382 X |
| 5,182,442 | 1/1993 | Takahira | 235/492 |
| 5,191,192 | 3/1993 | Takahira et al. | 235/375 |
| 5,212,373 | 5/1993 | Fujioka et al. | 235/492 |
| 5,220,158 | 6/1993 | Takahira et al. | 235/380 X |
| 5,225,667 | 7/1993 | Furuta et al. | 235/382 X |

FOREIGN PATENT DOCUMENTS

| | | |
|---|---|---|
| 0475716 | 3/1992 | European Pat. Off. . |
| 53-90447 | 7/1978 | Japan . |
| 61-68681 | 4/1986 | Japan . |
| 61-273689 | 12/1986 | Japan . |
| 62-287389 | 12/1987 | Japan . |
| 63-273979 | 11/1988 | Japan ................. 235/380 |
| 1-82194 | 3/1989 | Japan ................. 235/380 |
| 2226390 | 9/1990 | Japan . |
| 4113489 | 4/1992 | Japan ................. 235/492 |
| 4140895 | 5/1992 | Japan ................. 235/492 |
| 4171592 | 6/1992 | Japan ................. 235/492 |
| 4216189 | 8/1992 | Japan ................. 235/492 |
| 0525642 | 3/1993 | Japan ................. 235/492 |
| 2180424 | 3/1987 | United Kingdom . |

*Primary Examiner*—Donald Hajec
*Assistant Examiner*—Jeffrey R. Filipek
*Attorney, Agent, or Firm*—Sandler, Greenblum & Bernstein

[57] ABSTRACT

In a non-contact type IC card, a re-access inhibition time setting circuit 12 sets a re-access inhibition period of time for inhibiting the re-access for a fixed period of time after an operation of a main circuit 16 is finished. This prevents a double write operation of history in the card due to the re-access in a short period of time. Moreover, two areas 321 and 322 are disposed in a memory 32 to write data alternately in these areas. In a read operation, when data of one of the areas is destroyed, the normal data in the other area is read; whereas, when each data is normal, the data last recorded is read. Consequently, the disabled state of the read operation due to wrong data can be prevented.

21 Claims, 10 Drawing Sheets

F I G. 1
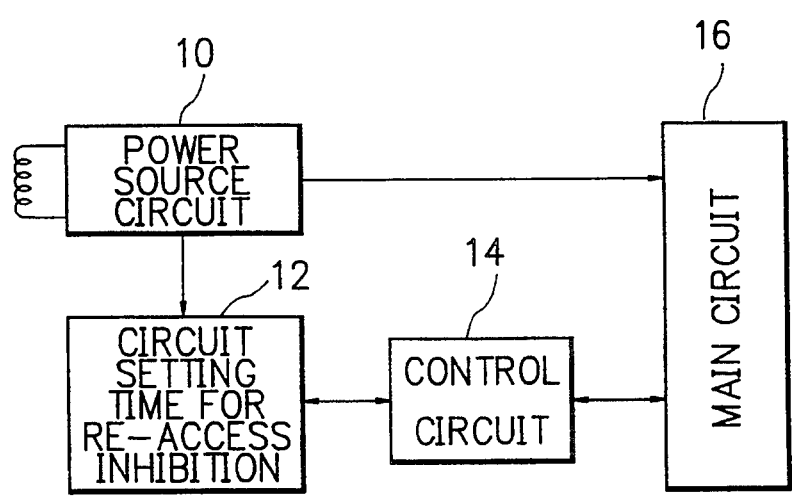

FIG. 6

| | DATA AREA D | NO.AREA N | CHECK CODE AREA C |
|---|---|---|---|
| AREA 321 | DATA 1 | 0 | CODE |
| AREA 322 | NO DATA | | |

FIG. 7

| | DATA AREA D | NO.AREA N | CHECK CODE AREA C |
|---|---|---|---|
| AREA 321 | DATA 1 | 0 | CODE |
| AREA 322 | DATA 2 | 1 | CODE |

FIG. 8

| | DATA AREA D | NO.AREA N | CHECK CODE AREA C |
|---|---|---|---|
| AREA 321 | DATA 3 | 2 | CODE |
| AREA 322 | DATA 2 | 1 | CODE |

FIG. 9

| | DATA AREA D | NO.AREA N | CHECK CODE AREA C |
|---|---|---|---|
| AREA 321 | NO DATA | | |
| AREA 322 | DATA n+1 | n | CODE |

F I G. 11
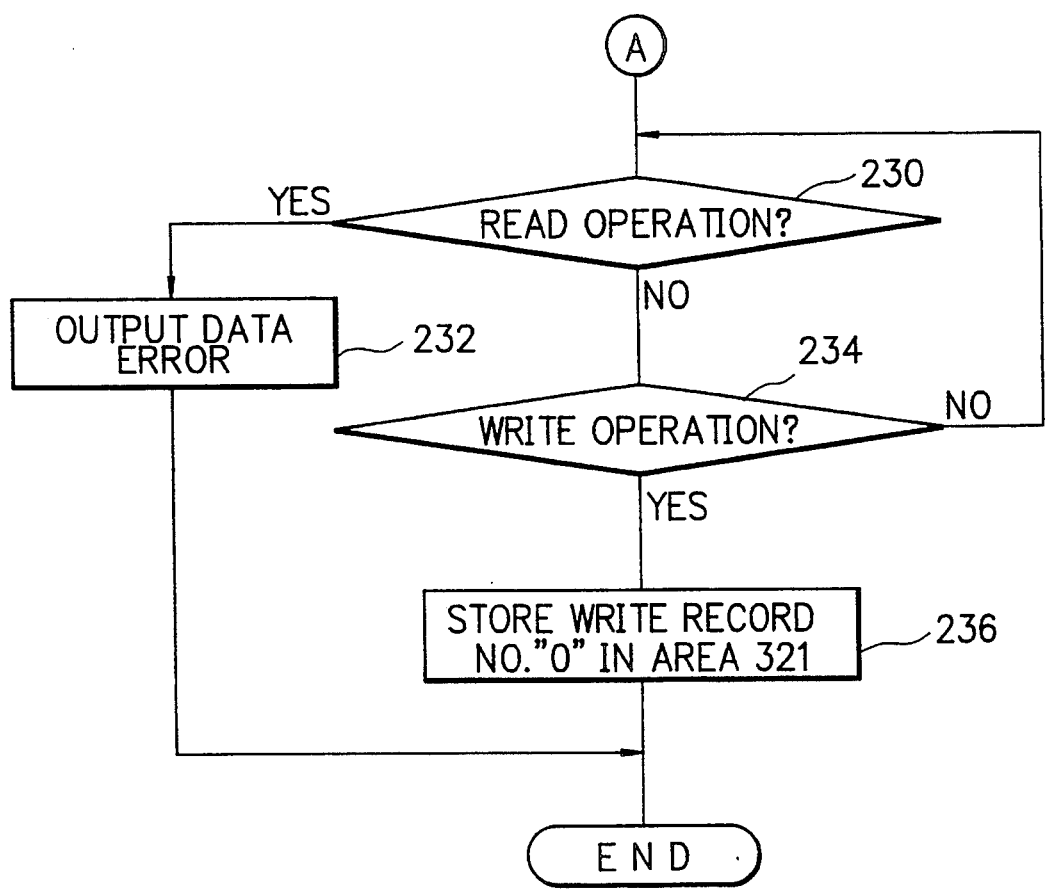

F I G. 12
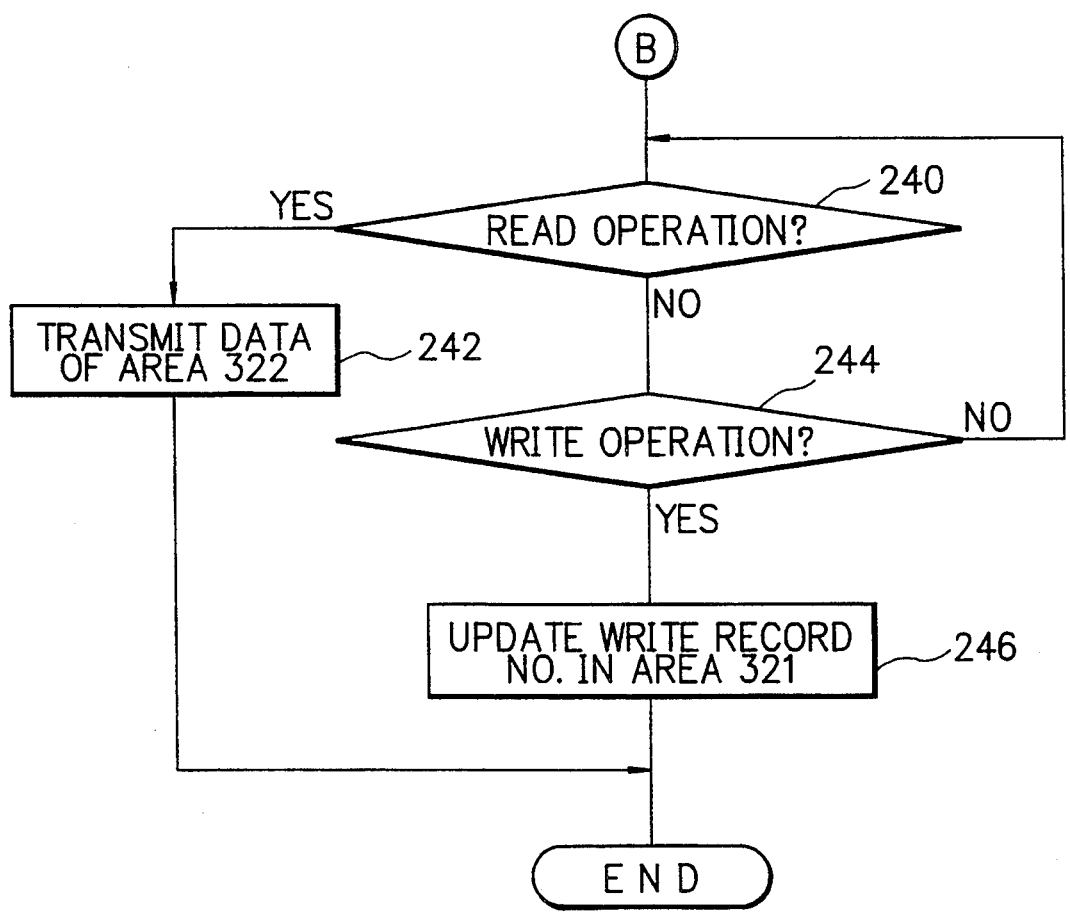

NON-CONTACT TYPE IC CARD

TECHNICAL FIELD

The present invention relates to a non-contact type integrated circuit (IC) card not having contact terminals for a power source and for inputting and outputting signals.

BACKGROUND ART

There has been known an IC card which as not contact terminals for receiving signals from an external device or for outputting signals thereto via a magnetic or capacitive coupling therewith. When using the non-contact type IC card, as compared with the card achieving communications of signals via contact terminals, the read operation is facilitated since, for example, when a person having the card in his or her hand approaches the external device, data stored in the card can be read therefrom into the external device. Moreover, there can be prevented such problems associated with the card achieving input and output operations of data via contact terminals as a contact failure due to dirt, erosion, etc. of terminal contact points and wrong operations due to a leakage current.

For the read operation of the non-contact type IC card, the card bearer having the card with him or her need only approach the reader and there is unnecessitated a read operation to insert the card into the reader. Consequently, the card is suitable for a check of sequential passage of many persons, for example, the card is suitably used as a commuter pass or a key for checking entrance an exit for a particular room.

In a case where the non-contact type IC card is adopted as a commuter pass or a key for checking entrance and exit for a room, ID data is read from a memory of the IC card for a collation thereof such that when the collation results in a coincidence, the passage of the gate or the entrance for the room is admitted. At the same time, historical data of uses of the IC card is written in the memory thereof.

When a non-contact type IC card is brought into an area accessible to the reader-writer, the collation and the write operation of the history are accomplished. Since the accessible area has a range of a certain magnitude, when the card is employed as, for example, a commuter pass, there may occur depending on actions of the card holder a case where an identical card enters two or more times the area accessible to the reader-writer installed at the gate. Namely, it may possible occur, the user puts the card into the area, removes the card from the area, and then puts again the card into the area. In such a case, it is necessary to avoid the write operation of history in the second access.

Conventionally, in the case above, the second access of an identical card is detected by the reader-writer to inhibit the write operation of new data on the card. However, since passage of many cards is required to be checked in a short period of time at the gate, it is necessary for the reader-writer, after an access of a card, to wait for passage of a subsequent card. Consequently, there does not exit any marginal time enough to check the second access.

In consequence, it is desired that the operation of a card is inhibited for a fixed period of time after a passage thereof. However, in a card not having a power source therein, namely, a card of an external power supply type, an electromagnetic energy supplied from an external device is rectified to obtain a direct-current (dc) voltage necessary for an internal circuit thereof. Consequently, after the external energy supply is interrupted, it is difficult to control the operation inhibition for a fixed period of time. For example, after the external energy supply is stopped, the circuit in the card may be operated by energy resultant from discharge of electric charges accumulated in a smoothing capacitor of the power source circuit. However, since the operation of the circuit is determined by a value of a current consumed by the circuit and the energy accumulated in the smoothing capacitor, it is difficult to set the period for inhibiting the operation.

Moreover, in such a non-contact type IC card, since the contact (approaching) state between the card and the reader-writer cannot be fixedly established, communications of data and power source become to be unstable in some cases. For example, in a card of the external power supply type which receives supply of power via energy such as an electromagnetic field from an external power source, the card is supplied with power only when the card is in the proximity of the reader-writer. When the card is apart from the reader-writer, the power is not supplied thereto. In consequence, in a case where the bearer of the card puts the card close to the reader-writer to write data received from the reader-writer in the memory of the card, when the contact state is changed because the distance between the card and the reader-writer is increased due to movement or the like of the bearer, the power supply from the reader-writer to the card is interrupted. Consequently, the write operation of data in the memory of the card is stopped at an intermediate point and hence data is stored in the memory in an incomplete state.

Since such incomplete data is directly stored in the memory, when the data is read therefrom by the reader-writer, it is impossible to accomplish a predetermined check operation. For example, when the card is adopted as a commuter pass, the states of the pass such as a period thereof, a valid period thereof, a station name where the bearer took the train, and time when the bearer took the train are required to be accurate in any case. Otherwise, there arises a problem that the essential object of the card cannot be achieved.

It is therefore an object of the present invention to provide a non-contact type IC card guaranteeing the normal operation even when an abnormality occurs in an access operation between the card and the external device, thereby solving the problems of the non-contact type IC card.

Namely, the present invention aims at providing a non-contact type IC card capable of preventing inappropriate data from being written therein even when the card enters an area accessible to the external device for a plurality of times at a short interval of time.

Moreover, another object of the present invention is to provide a non-contact type IC card guaranteeing the normal operation even when an abnormality occurs in the contact state during a write operation of data from the external device.

DISCLOSURE OF THE INVENTION

In accordance with the present invention, a non-contact type IC card achieving communications of signals with an external device in a noncontact manner includes main circuit means for conducting various operations based on functions of the IC card, operation inhibition signal generating means for creating an operation inhibition signal to inhibit the operation of the main circuit means for a predetermined period of time, and control means for controlling the main circuit means and the operation inhibition signal generating means. The control means operates the operation inhibition signal generating means when the operation of the main circuit means is finished and inhibits the operation of the main circuit means for a predetermined period of time according to the operation inhibition signal from the operation inhibition signal generating means.

In accordance with the present invention, when an operation of the main circuit means is finished, the operation inhibition signal generating means operates to create an operation inhibition signal, thereby inhibiting the operation of the main circuit means for a predetermined period of time. In consequence, in a case where the card enters an area accessible to the external device a plurality of times during a short period of time, the second and subsequent accesses can be inhibited and hence the improper operation due to the plural accesses can be avoided. Moreover, since the inhibition of such accesses need not be monitored by the external device, the load imposed on the external device can be minimized.

In accordance with the present invention, a non-contact type IC card includes communicating means for communicating signals with an external device in a non-contact manner, a memory for storing therein data sent from the external device, and control means for controlling operations of the communicating means and the memory. The memory has an area subdivided into a plurality of areas for storing therein data sent from the external device, and the control means reads, when the data is to be read from the memory, the data from one of the plural areas in which the data is normally stored.

In accordance with the non-contact type IC card of the present invention, an area of a memory for storing therein data sent from the external device is subdivided into a plurality of areas such that when reading data from the memory, the data is read from an area of the plural areas in which the data is normally stored. In consequence, even when the data recorded in one of the areas is wrong, the data can be read from the other area. Consequently, even when an abnormality occurs in a write operation of data, the data can be read therefrom.

In consequence, a write operation of wrong data or absence of record data which occurs when the card holder moves therewith at a high speed can be coped with by executing a predetermined processing with the normal data read from the memory.

BRIEF DESCRIPTION OF THE DRAWINGS

FIG. 1 is a functional block diagram showing an embodiment of a non-contact type IC card in accordance with the present invention;

FIG. 6 shows a write operation of data in a memory of the card of FIG. 5;

FIG. 7 shows a write operation of data in a memory of the card of FIG. 5;

FIG. 8 shows a write operation of data in a memory of the card of FIG. 5;

FIG. 9 shows a write operation of data in a memory of the card of FIG. 5;

FIG. 11 is a flowchart showing the operation of the card of FIG. 5;

FIG. 12 is a flowchart showing the operation of the card of FIG. 5; and

BEST MODE FOR CARRYING OUT THE INVENTION

Referring next to the accompanying drawings, description will be given in detail of a non-contact type IC card in accordance with the present invention.

FIG. 1 shows an embodiment of a non-contact type IC card in accordance with the present invention. This IC card is an IC card of an external power supply type receiving power supply from an external device. In this connection, portions not directly related to the present invention are not shown in this embodiment.

The card has a power source circuit 10. The power source circuit 10 is a power supply circuit for transmitting power supplied from a reader-writer to the respective components of the card. The power source circuit 10 is coupled with the reader-writer via a magnetic coupling shown in the diagram or a capacitive coupling not shown therein to receive power supplied from the reader-writer.

Figure 5:
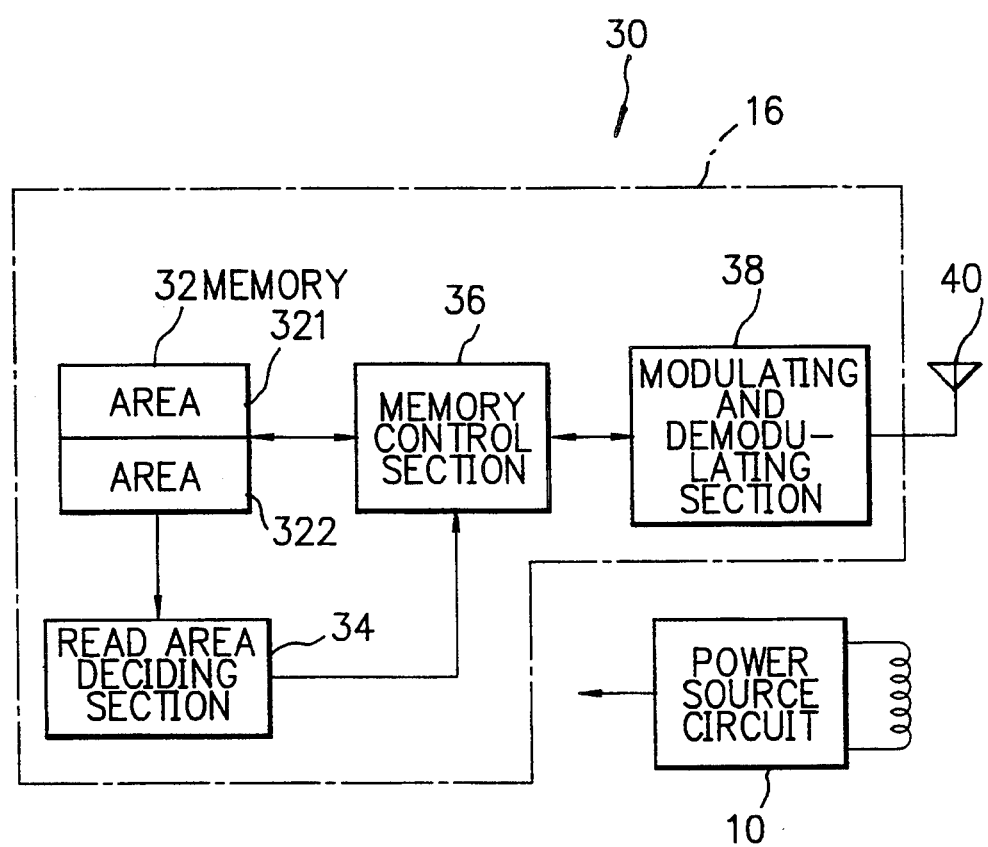
FIG. 5 is a block diagram showing another embodiment of a non-contact type IC card in accordance with the present invention.

The power source circuit 10 is connected to a main circuit 16. The main circuit 16 is a circuit accomplishing operations according to various functions of the card and is constituted with a central processing unit (CPU), a memory, etc. For example, as shown in FIG. 5, there are included a memory 32 and a memory control section 36.

The main circuit 16 has a function to read, when the card is put by the bearer into an area accessible to the reader-writer, ID data from the memory 16 to output the data to the reader-writer and/or a function to collate ID data sent from the reader-writer with data stored in the memory 32. Moreover, the main circuit 16 writes in the memory 32, after the passage of the bearer is admitted by the reader-writer as a result of such a collation of the ID data, an indication that the passage is admitted by the data sent from the reader-writer.

The card in addition has a re-access inhibition time setting circuit 12. The circuit 12 is connected to the power source circuit 10 to set a period of time for inhibiting a re-access based on a voltage supplied from the power source circuit 10 and a control signal sent from the control circuit 14 and then outputs a re-access inhibition time setting signal to the control circuit 14.

The control circuit 14 is connected to the circuit 12 and the main circuit 16 to inhibit the operation of the main circuit 16 for a predetermined period of time according to the re-access inhibition time setting signal outputted from the circuit 12. Furthermore, the control circuit 14 controls, in accordance with an access operation terminating signal transmitted from the main circuit 16, the setting operation of the circuit 12.

Figure 2:
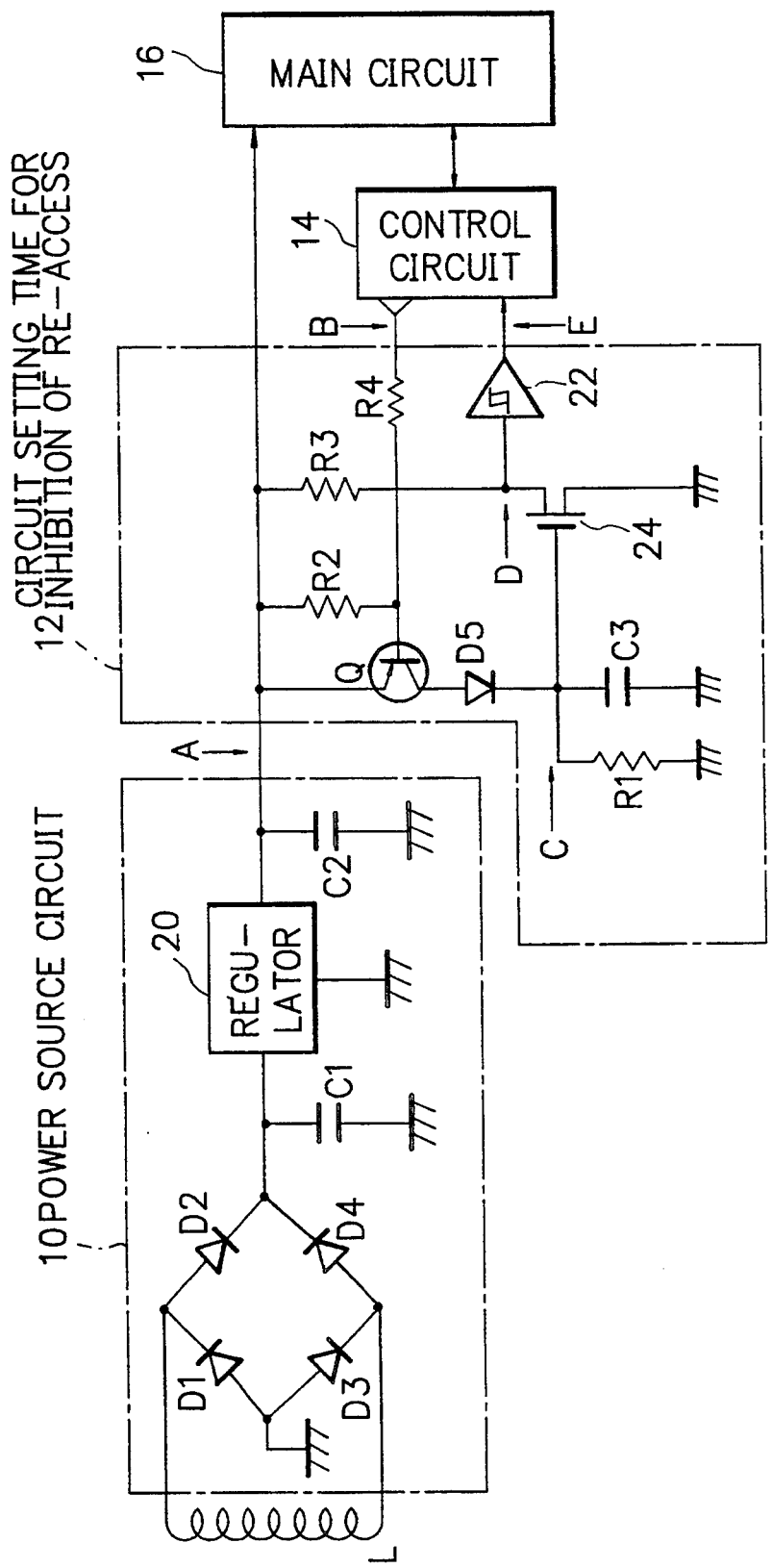
FIG. 2 a circuit diagram showing a specific example of the card of FIG. 1.

FIG. 2 shows a more specific construction of the circuit of FIG. 1. Four diodes D1, D2, D3, and D4; two capacitors C1 and C2; and a regulator 20 are disposed as elements corresponding to the power source circuit 10 of FIG. 10. Electric energy supplied from the reader-writer via a coil L is rectified by the diodes D1 to D4 and the regulator 20. Alternating-current components are removed therefrom by the capacitors C1 and C2 such that the resultant signal is sent to the main circuit 1 and the re-access inhibition time setting circuit 12.

The circuit 12 possesses a transistor Q. The transistor Q has an emitter region connected to an output of the power source circuit 10 and a base region which is connected via a resistor R2 to the output from the power source 10 and which is connected via a resistor R4 to an output of the control circuit 14. The transistor Q has a collector region linked with an anode of the diode D5 having a cathode connected to a resistor R1 and a capacitor C3. Other terminals respectively of the resistor R1 and the capacitor C3 are grounded. The cathode of the diode D5 is further connected to a gate region of an field-effect transistor (FET) of an n-type channel 24. The FET 24 has a drain region which is linked via a resistor R3 to an output of the power source circuit 10 and which is linked to a Schmitt trigger circuit 22, whereas the FET 24 has a source region grounded. The Schmitt trigger circuit 22 has an output connected to an input of the control circuit 14.

Referring to the timing chart of FIG. 3, the operation of the circuit 12 will be described. In a case where the card is used as a commuter pass and is put into an accessible area of the reader-writer at a gate twice in a short period of time, the circuit 12 sets an inhibition time for inhibiting the second access.

Figure 3:
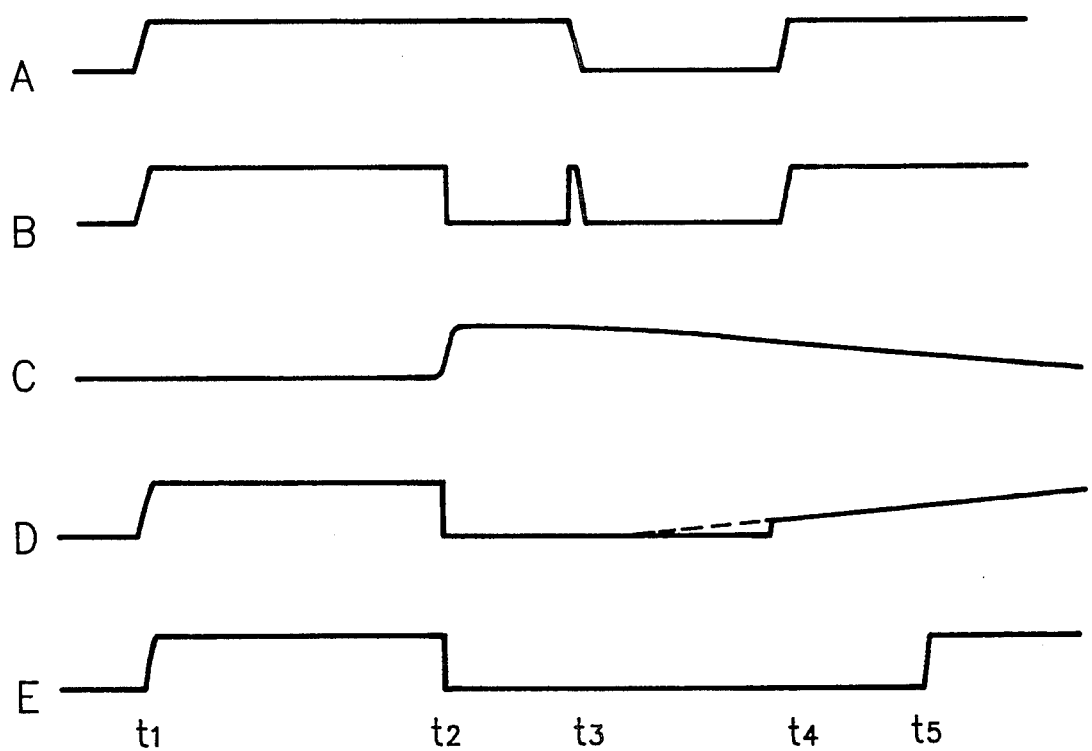
FIG. 3 is a timing chart showing the operation of the circuit of FIG. 2.

At a point A of FIG. 2, power as indicated by A in FIG. 3 is supplied as an output from the power source circuit 10. Namely, when the card enters the accessible area of the reader-writer twice (at points of time t1 and t4), energy is supplied at each point of time from the reader-writer via the power supply circuit 10. When power is supplied at the point A, the power is fed to the main circuit 16, thereby enabling the main circuit 16 to operate. During the operation of the main circuit 16, as indicated by B in FIG. 3, the main circuit 16 is powered and a signal B denoting that the main circuit 16 is operable is delivered via the resistor R4 to the base region of the transistor Q (time t1). Consequently, the transistor Q is in a non-conductive state and the power supplied to the point A is not fed to a point C. The potential of the point C is hence at a ground level as designated by C in FIG. 3. In consequence, since any signal is not inputted to the gate region of the FET 24, the FET 24 is in a non-conductive state and a point D of the drain region of the FET 24 is supplied with the output from the power source circuit 10 as indicated by D in FIG. 3. As a result, the output from the Schmitt trigger circuit 22 is also as denoted by E in FIG. 3 and the output E is transmitted to the control circuit 14. The control circuit 14 outputs, according to the output E, a signal allowing the operation of the main circuit 16 to the main circuit 16.

When the operation of the main circuit 16 is finished (time t2), the output of the signal B from the control circuit 14 is stopped. This sets the base region of the transistor Q to a low level and hence the transistor Q becomes to be conductive, which increases the potential at the point C as denoted by C in FIG. 3. At the time t3 when the power supply A from the power source circuit 10 is interrupted, the power from the power source circuit 10 is not supplied to the point C. However, according to a discharging operation of electric charge accumulated in the capacitor C3 during the power supply period, the potential of the point C is gradually decreased in accordance with the time constant of the capacitor and the resistor as indicated by C in FIG. 3.

At a point of time T4, when the card is again put into the accessible area of the reader-writer and the second power is supplied from the power source circuit 10, a signal B indicating that power can be supplied to the main circuit 16 is sent from the control circuit 14 to the transistor Q, which sets the transistor Q to a non-conductive state. In consequence, the point C is kept remained in a state where power is not supplied from the power source circuit 10 and hence the potential of the point C continues lowering as shown in FIG. 3. As a result, since the potential inputted to the gate region of the FET 24 continues decreasing and the current flowing from the drain region to the source region of the FET 24 is minimized, the potential of the point D is gradually increased. In consequence, the voltage D inputted to the Schmitt trigger circuit 22 is gradually increased, at a point of time t5 where the voltage D exceeds the predetermined value, a signal E is outputted from the Schmitt trigger circuit 22. According to this output E, the control circuit 14 outputs a signal allowing the operation of the main circuit 16 to the main circuit 16.

As above, after the output E from the Schmitt trigger circuit 22 is set to a high level, the operation of the main circuit 16 is allowed. Consequently, after the first operation (access to the reader-writer) of the main circuit 16 at the point of time t2 is finished, the operation of the main circuit 16 is not allowed until a point of time t5. In consequence, even in a case where the card is put to the accessible area at the time t4 to supply power from the power source circuit 10, the main circuit 16 does not achieve any operation. As above, after the first access is terminated, the access to the reader-writer can be inhibited for a fixed period of time.

Figure 4:
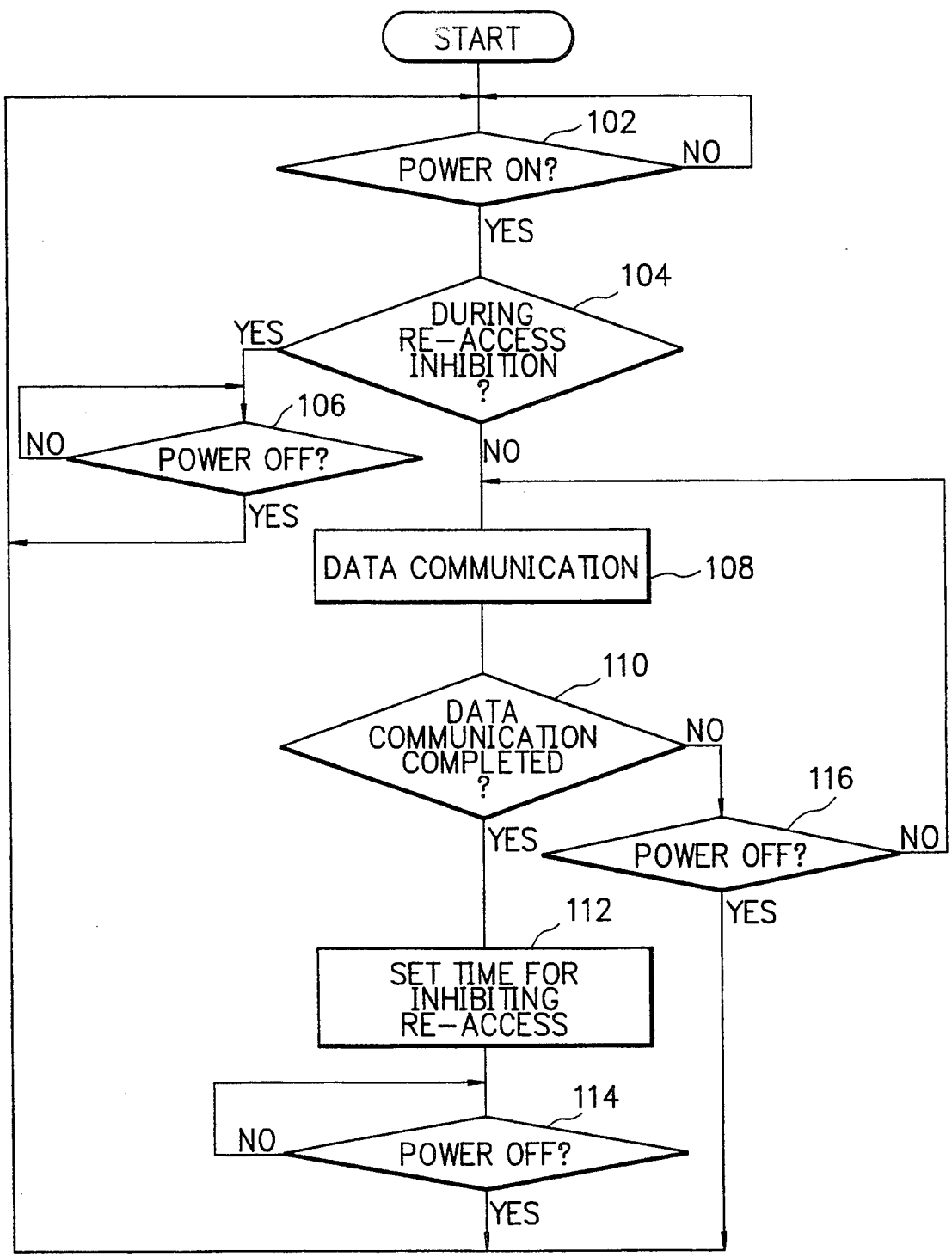
FIG. 4 is a timing chart showing the operation of the control circuit of FIG. 2.

Subsequently, the operation of the control circuit 14 will be described by reference to the flowchart of FIG. 4. Whether or not power is being supplied is judged (step 102). If this is not the case, a wait operation is effected until the power-on state occurs. If the power is being supplied, it is assumed that the card has entered the accessible area of the reader-writer and a check is made to determine whether or not the point of time is during the re-access inhibition period (step 104). If this is the case, whether or not the power is off is judged (step 106). If the power is not off, a wait operation is achieved until the power is turned off. When the power is turned off, it is assumed that the card is removed from the accessible area of the reader-writer and control is returned to the first step 102.

In the step 104, if the current point is not in the re-access inhibition period, it is assumed that the access to the reader-writer becomes to be possible and then a predetermined data communication is achieved with the reader-writer (step 108). Whether or not the data communication has been completed is judged (step 110). If this is the case, the re-access inhibition period is set (step 112). Thereafter, whether or not the power is turned off is checked (step 114). If the power is not turned off, a wait operation is executed until the power is turned off. When the power is turned off, it is assumed that the card is removed from the accessible area of the reader-writer and then control is returned to the first step 102.

Also in the case where the data communication is not completed in the step 110, whether or not the power is turned off is judged (step 116) such that if this is the case, control is passed to the step 102.

As above, in accordance with the card of the present embodiment, after an access is finished, the re-access can be inhibited for a fixed period of time. In consequence, in a case where the card enters the accessible area of the reader-writer two or more times in a short period of time, the second and subsequent accesses to the reader-writer can be inhibited and hence the inappropriate operation due to a plurality of accesses can be prevented. Moreover, since the card has the function to inhibit the access, the operation to inhibit the re-access of the card need not be achieved by the reader-writer, thereby minimizing the load imposed on the reader-writer.

In accordance with the card, in a case where, for example, it is necessary at a gate to check passages of many cards in a short period of time, the reader-writer is not required to check the re-access. Consequently, after an access of a card, the reader-writer can immediately await a passage of the next card, which enables the accesses to many cards in a smooth manner.

In accordance with the present invention as described above, when the operation of the main circuit means is terminated, the operation inhibition signal generating means operates to create an operation inhibition signal, thereby inhibiting the operation of the main circuit means for a predetermined period of time. Consequently, in a case where the card enters an area accessible to the external device a plurality of times in a short period of time, the second and subsequent accesses can be inhibited, thereby preventing the inappropriate operation due to the plural accesses. Furthermore, since the access inhibition above need not be monitored by the external device, the load on the external device can be reduced.

FIG. 5 shows another embodiment of a non-contact type IC card in accordance with the present invention. This card 30 includes a memory 32 of an electrically erasable programmable ROM (EEPROM) or the like. The memory 32 has two areas 321 and 322 in this embodiment. As will be described later, in the IC card of the embodiment, data items are recorded in these two areas 321 and 322 together with numbers indicating sequence numbers of the data item write operation. In a data read operation, the data items are read by referencing the numbers in the areas so that data is read from one of the areas last undergone a recording operation. Moreover, in a case where data recorded in either one of the two areas 321 and 322 is in a destroyed state due to, for example, an interruption of a data write operation, data recorded in the remaining one thereof is read. With the provision of two areas, even when an abnormality occurs during a data write operation in one of the areas of the card, data can be read from the remaining area for use thereof, which thereby prevents an operation failure. In this connection, the number of areas disposed in the memory 32 is not limited to two, namely, the number may be three or more.

The card 30 further include a read area deciding section 34 connected to the memory 32. The read area deciding section 34 judges to determine from which one of the two areas 321 and 322 of the memory data is to be read. The memory 32 and the section 34 are connected to a memory control section 36. The section 36 controls according to commands an operation to write in the memory 32 data sent from a reader-writer, not shown, via a noncontact terminal 40 and a modulating and demodulating section 38 and an operation to read data stored in the memory 32 so as to feed the data to the reader-writer. The memory control section 36 achieves a control operation to record data sent from the reader-writer alternately in the two areas 321 and 322 together with the numbers indicating the recording order. Moreover, particularly, the section 36 controls a data read operation to read data from an area determined by the section 34.

The modulating and demodulating section 38 modulates data outputted from the memory control section 36 to the reader-writer and demodulates data inputted from the reader-writer via the noncontact terminal 40. The terminal 40 is used to communicate data with the reader-writer, not shown, in a noncontact manner.

The power source circuit 10 is, like in the embodiment described above, a circuit to send power supplied from the reader-writer to the respective sections of the card 30. The power source circuit 10 is coupled with the reader-writer via a magnetic coupling shown in the diagram or a capacitive coupling, not shown, to receive power supplied from the reader-writer.

Referring to the changes in the recording state of the memory 32 shown in FIGS. 6 to 9, description will be given of the operation to write data in the memory 32. In each of the areas 321 and 322, there are disposed the areas including a data area D in which data is recorded, a number area N in which a number of a write sequence of data is recorded, and a check code area in which a check code is recorded.

Immediately after the card 30 is issued, as shown in FIG. 6, there are recorded data 1, "0" as the number denoting the write sequence, and a predetermine code C such as a DDC code in the data areas D, N, and C, respectively. The data recorded in the data area D is one of various kinds of data items such as an ID number communicated between the IC card and the reader-writer. The number indicating the write sequence recorded in the number area N indicates a write sequential number of data recorded in the data area D of each of two areas. As shown in FIG. 6, immediately after the issuance of the card 30, "0" is recorded as an initial value. The check code recorded in the check code area C is used to determine whether or not the data is normal, and one of the known various codes is employed.

For the data to be recorded in the data area D, data inputted from the reader-writer via the noncontact terminal 40 is demodulated by the modulating and demodulating section 38 and is then sent from the memory control section 36 to the memory 32 so as to be stored therein. Moreover, the data to be recorded in the data area D and the code to be recorded in the check code area C are generated by the memory control section 36 and is then sent to the memory 32 to be stored therein.

Immediately after the issuance of the card 30, any data is not recorded in the area 322. Consequently, in a data read operation, the data in the area 322 is assumed to be in a destroyed state by the read area deciding section 34 such that data recorded in the area 321 is read by the memory control section 36.

Next, as shown in FIG. 7, a first data write operation is accomplished in the area 322. As shown in this diagram, data 2 is recorded in the data area D and a number "1" is recorded as a data record sequential number in the number area N. In the check code area C, there is recorded a predetermined check code. In a state in which the first data write operation has been conducted, the section 34 compares the number recorded in the number area N of the area 321 with that recorded in the number area N of the area 322 to determine that the data recorded in the area 322 is the latest data. Consequently, in the data read operation, the data 2 recorded in the area 322 is read.

In addition, as shown in FIG. 8, a second data write operation is achieved in the area 321. The data write operations are conducted as above in the two areas 321 and 322 in an alternating manner.

As a result of the second data write operation of FIG. 8, in the area 321, data 3 is recorded in the data area D, a number "2" is recorded as a data record sequential number in the number area N, and a predetermined check code is recorded in the check code area C. In a state where the second data write operation is achieved as above, the data recorded in the area 321 is the latest data and hence the data 3 recorded in the area 321 is read in the data read operation.

Subsequently, in a similar manner, data write operations are conducted in the two areas 321 and 322 in an alternating fashion. For example, as shown in FIG. 9, in a case where after the n-th data is correctly written in the area 322, if the (n+1)-th data write operation in the area 321 results in a failure, the data in the area 321 is in the destroyed state. Consequently, in this case, the read area deciding section 34 assumes, without achieving the comparison between the numbers stored in the number areas N of the two areas, that the data recorded in the area 322 is the latest data such that the data is read by the memory control unit 36.

Subsequently, the operation of the IC card 30 will be described according to the flowcharts shown in FIGS. 10 to 13.

Figure 10:
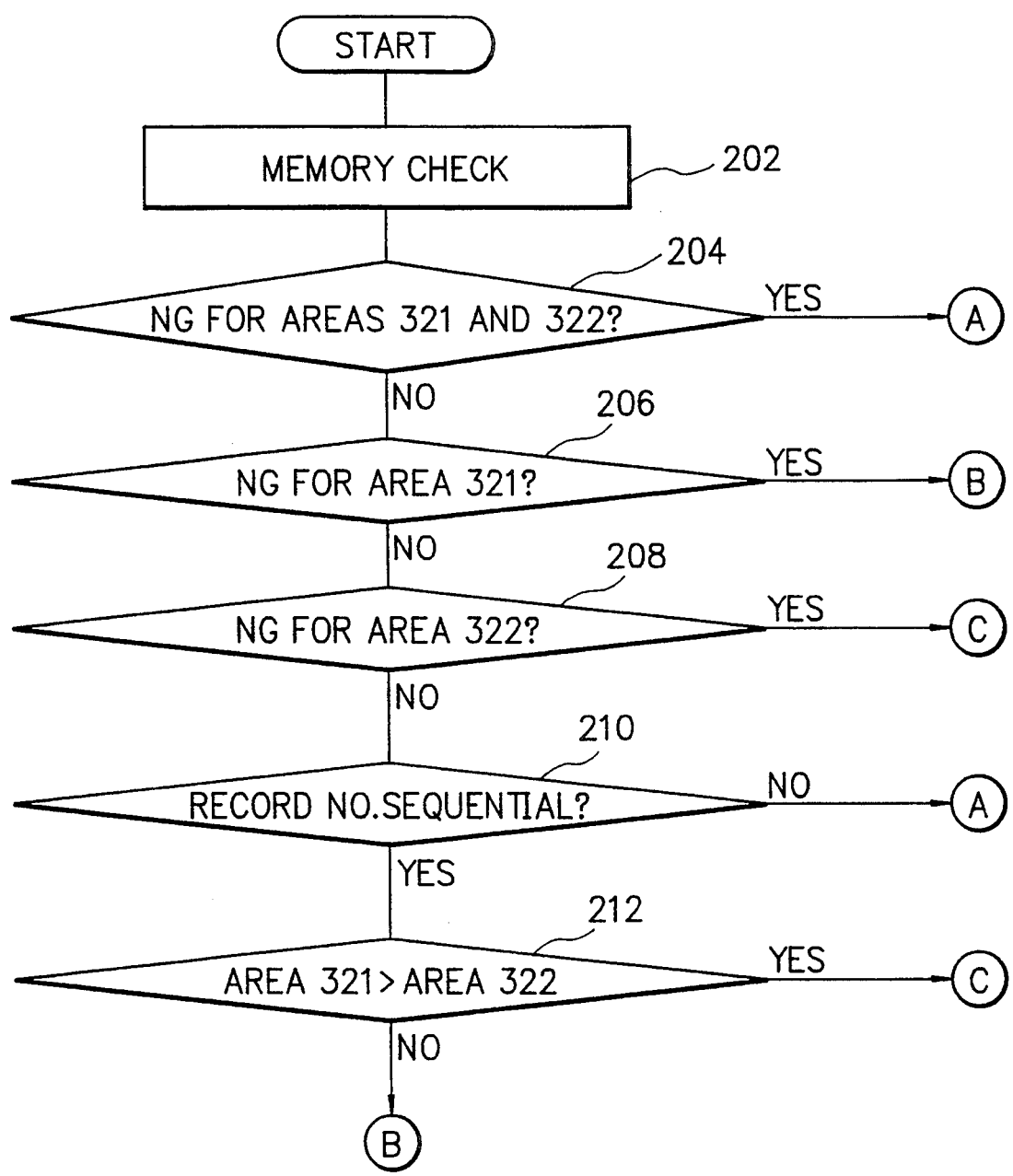
FIG. 10 is a flowchart showing the operation of the card of FIG. 5.
Figure 13:
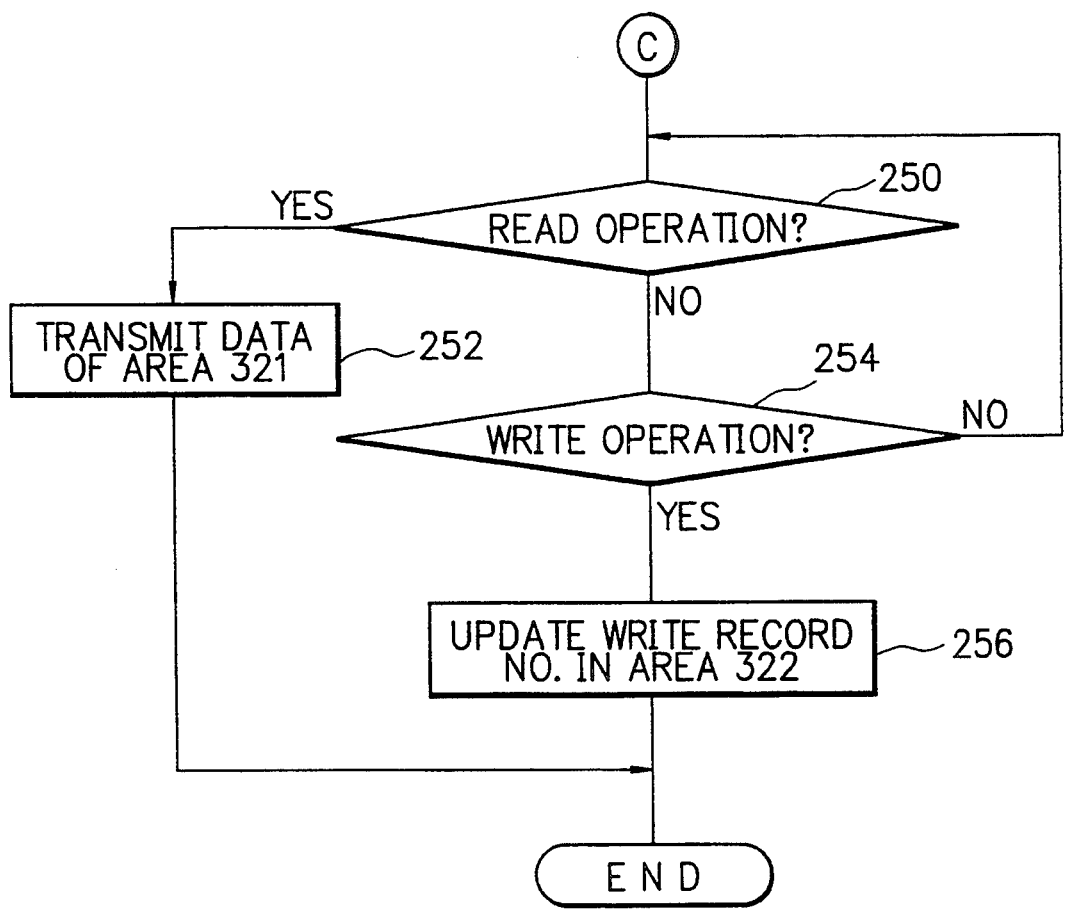
FIG. 13 is a flowchart showing the operation of the card of FIG. 5.

First, in a step 202 of FIG. 10, normality or abnormality of the data in the two areas 321 and 322 of the memory 32 is judged by checking the check code by the read area deciding section 34. Whether or not the data of each of the areas 321 and 322 is wrong (NG) is judged (step 204). If this is the case, the section 34 outputs a signal of the condition to the section 36, which then proceeds to the processing of FIG. 11.

In a step 230 of FIG. 11, the section 36 judges to determine whether or not a read operation is to be executed. If this is the case, a signal indicating that the memory 32 is in the destroyed state is outputted from the section 36 to the reader-writer (step 232). Otherwise, whether or not a write operation is to be executed is judged (step 234). If this is the case, data is written in the data area D of the area 321 and a number "0" is recorded in the number area N (Step 236). If the write operation is not assumed in the step 234, control is returned to the step 230 to repeatedly achieve the same operation.

In the step 204 of FIG. 10, if data of both of the two areas 321 and 322 are not wrong (NG), control is passed to a step 206 such that the section 34 checks to determine whether or not the data in the area 321 is NG. If this is the case, control is transferred to the processing of FIG. 12.

In a step 240 of FIG. 12, the section 36 judges to decide whether or not a read operation is to be executed. If this is the case, data recorded in the area 322 is read to be transmitted to the reader-writer (step 242). Otherwise, whether or not a write operation is to be achieved is judged (step 244). If this is the case, data is written is the data area D of the area 321 and the number to be written in the number area N is updated (step 246). In the step 244, if the write operation is not assumed, control is returned to the step 240 to repeatedly accomplish the same operation.

In the step 206 of FIG. 10, when the data in the area 321 is not NG, control proceeds to a step 208 in which the section 34 judges to determine whether or not the data in the area 322 is NG. If this is the case, control is passed to the processing of FIG. 13. In a step 250 of FIG. 13, the section 36 judges to decide whether or not a read operation is to be executed. If this is the case, data recorded in the area 321 is read to be transmitted to the reader-writer (step 252). In the case of a write operation, data is written in the data area D of the area 322 and a number to be written in the number area N is updated (step 256). In the step 254, when the write operation is not assumed, control is returned to the step 250 to repeatedly accomplish the same operation.

In the step 208 of FIG. 10, when the data in the area 322 is not NG, control proceeds to a step 210 such that the section 34 judges to determine whether or not the number recorded in the number area N of each of the areas is successive. If this is not the case, data of each of the areas is assumed to have been destroyed and control is transferred to the processing of FIG. 11. If the number is consecutive, the number of the area 321 is compared with that of the area 322 (step 212). If the number of the area 321 is larger than that of the area 322, the section 34 assumes that the data recorded in the area 321 is the latest data and then passes control to the processing of FIG. 13 to read data from the area 321. In the step 212, if the number of the area 321 is smaller than that of the area 322, the section 34 assumes that the data recorded in the area 322 is the latest data and then transfers control to the processing of FIG. 12 to read data from the area 322.

As above, according to the IC card of the present embodiment, the memory 32 is subdivided into two areas 321 and 322 to record data alternately in these areas with a number indicating a write sequential number assigned to each of the recorded data. In consequence, even when data recorded in one of these areas is wrong, data can be read from the other area and hence the data read operation is not prevented even when an abnormality occurs in the data write operation.

For example, when the card is adopted as a commuter pass or a key for entrance and exit for a place, in a case where the holder moves at a high speed while putting the card in the proximity of the reader-writer, the power supply from the reader-writer is interrupted at an intermediate point of the data write operation and hence the data thus written is wrong. However, also in such a case, data such as the gate check state is kept in the other area; consequently, the disabled state of the data read operation can be avoided by reading the recorded data.

In addition, when the data recorded in each of the areas is normal, the numbers recorded in the number areas N of the two areas are compared with each other to select and to read the last recorded data. Consequently, although data items are recorded in two areas, it will not occur that the old data is read by mistake.

In accordance with the non-contact type IC card of the present invention, the memory has an area subdivided into a plurality of areas for storing therein data sent from an external device. In a case of an operation to read data from the memory, the data is read from one of the areas in which the data is normally recorded. Consequence, also in a case where data recorded in an area is wrong, data can be read from another area and hence the data read operation is not disabled even when an abnormality takes place in the data write operation.

Consequently, a write operation of wrong data and absence of record data caused, for example, when the card holder moves at a high speed with the card can be coped with by reading the normal data so as to conduct a predetermined processing.

FIG. 14 shows further another embodiment of a non-contact type IC card in accordance with the present invention. This card includes both configurations of the cards shown in FIGS. 1 and 5. According to this card, as can be appreciated from the explanation above, after an access is finished, a re-access can be inhibited for a fixed period of time. In consequence, when the card enters an accessible area of the reader-writer two or more times in a short period of time, the second and subsequent accesses to the reader-writer can be inhibited and hence an inappropriate operation due to the plural access can be prevented. Moreover, since the card has a function to inhibit the access, the operation to inhibit the re-access of the card need not be accomplished by the reader-writer and hence the load imposed on the reader-writer can be mitigated.

Furthermore, a memory 32 is subdivided into two areas 321 and 322 such that data is recorded alternately in these areas with a number indicating a write sequence number assigned to the recorded data. Consequently, even when data recorded in one of the areas is wrong, data can be read from the other area and hence the data read operation is not disabled even when an abnormality occurs in the data write operation.

Moreover, in a case where data written in each of the areas is normal, the numbers recorded in the number areas N of the two areas are compared with each other so as to select and to read the latest record data. Consequently, although data items are recorded in two areas, the old data cannot be read by mistake.

In this regard, the respective embodiments have been described in conjunction with non-contact type IC card of an external power supply type to which power is supplied from an external device. However, the present invention is not restricted by the IC card of the external power supply type and is also applicable to an IC card of an integrated power supply type. In a case of the IC card of the integrated power supply type, there is disposed an integrated power source in addition to the power source circuit 10 above.

I claim:

1. A non-contact type IC card that communicates signals with an external device in a non-contact manner, comprising:
   main circuit means for conducting various operations based on functions of said non-contact type IC card;
   operation inhibition signal generating means for creating an operation inhibition signal to inhibit an operation of said main circuit means for a predetermined period of time; and
   control means for controlling said main circuit means and said operation inhibition signal generating means,
   wherein said control means operates said operation inhibition signal generating means when said operation of said main circuit means is finished and inhibits said operation of said main circuit means for a predetermined period of time according to said operation inhibition signal from said operation inhibition signal generating means.

2. A non-contact type IC card in accordance with claim 1, further comprising power source circuit means for receiving power supplied from an external device and supplying said power to each section of said non-contact type IC card,
   wherein said main circuit means and said operation inhibition signal generating means operate by receiving power from said power source circuit means.

3. A non-contact type IC card in accordance with claim 2, said operation inhibition signal generating means comprising means for accumulating said power supplied from said power source circuit means and discharging said power according to a predetermined time constant, means for inverting an output from said accumulating means to obtain a gradually increasing voltage, and means for outputting said operation inhibition signal when said voltage obtained from said inverting means exceeds a predetermined value.

4. A non-contact type IC card in accordance with claim 3, said operation inhibition signal generating means further comprising a switching transistor operated by a control signal from said control means to control said accumulation of power supplied from said power source circuit means in said accumulating means.

5. The non-contact type IC card of claim 3, wherein said outputting means comprises a Schmitt trigger circuit.

6. The non-contact type IC card of claim 1, wherein said operation inhibition signal generating means comprises:
   means for accumulating electrical power supplied from a power source circuit and for discharging said electrical power according to a predetermined time constant;
   means for inverting an output from said accumulating means to obtain a gradually increasing voltage; and
   means for outputting said operation inhibition signal when said voltage obtained from said inverting means exceeds a predetermined value.

7. The non-contact type IC card of claim 6, further comprising means for receiving said electrical power from an external device.

8. The non-contact type IC card of claim 7, wherein said electrical power from said external device is magnetically coupled to said non-contact type IC card.

9. The non-contact type IC card of claim 7, wherein said electrical power from said external device is capacitively coupled to said non-contact type IC card.

10. A non-contact IC card, comprising:
    means for communicating signals with an external device in a non-contact manner;
    a memory for storing data sent from said external device; and
    means for controlling operations of said communicating means and said memory,
    wherein said control means comprises means for reading, when data is to be read from said memory, data from one of a plurality of areas in which data is normally stored, and means for inhibiting an operation of said non-contact IC card for a predetermined period of time upon an occurrence of a predetermined event.

11. A non-contact type IC card in accordance with claim 10, wherein said controlling means reads, when there are said plurality of areas in which data is normally stored, data from one of said plurality of areas in which data is last stored.

12. A non-contact hype IC card in accordance with claim 11, further comprising means for recording number data in each of said plurality of areas of said memory representing a recording sequence number of said data.

13. A non-contact type IC card in accordance with claim 10, further comprising a power source circuit for receiving power from an external device and supplying said power to said communicating means, said memory and said control means.

14. A non-contact type IC card, comprising:
means for communicating signals with an external device in a non-contact manner;
a memory for storing data sent from said external device;
first control means for controlling operations of said communicating means and said memory;
operation inhibition signal generating means for generating an operation inhibition signal for inhibiting said operations of said communicating means, said memory, and said first control means; and
second control means for controlling said operation inhibition signal generating means,
wherein said memory has an area subdivided into a plurality of areas for storing therein data sent from said external device;
said first control means reads, when data is to be read from said memory, said data from one of said plurality of areas in which data is normally stored; and
said second control means operates said operation inhibition signal generating means when said operations of said communicating means, said memory, and said first control means are finished and inhibits for a predetermined period of time said operations of said communicating means, said memory, and said first control means according to said operation inhibition signal from said operation inhibition signal generating means.

15. A data storage device that prevents the exchange of erroneous data with an external device, comprising:
a memory for storing data;
means for exchanging data between said memory and said external device in a non-contact manner; and
means for inhibiting an operation of said memory and said data exchanging means for a predetermined period of time after said data storage device completes an exchange of data with said external device.

16. The data storage device of claim 15, further comprising means for receiving electrical power supplied from an external device, said power being supplied to said memory, said exchanging means and said inhibiting means.

17. The data storage device of claim 16, wherein said electrical power supplied from said external device is magnetically coupled to said data storage device.

18. The data storage device of claim 16, wherein said electrical power supplied from said external device is capacitively coupled to said data storage device.

19. The data storage device of claim 15, wherein said inhibiting means comprises means for accumulating electrical power supplied from an external device, said accumulated electrical power being discharged according to a predetermined time constant.

20. The data storage device of claim 19, further comprising:
means for inverting an output of said accumulating means to obtain a gradually increasing voltage; and
means for triggering said inhibiting means to output an inhibiting signal when said voltage of said inverting means exceeds a predetermined value.

21. The data storage device of claim 15, further comprising a processing unit that controls various operations of said memory, said exchanging means and said inhibiting means.

* * * * *

UNITED STATES PATENT AND TRADEMARK OFFICE
CERTIFICATE OF CORRECTION

PATENT NO. : 5,378,887
DATED : January 3, 1995
INVENTOR(S) : Yoshinori KOBAYASHI It is certified that error appears in the above-indentified patent and that said Letters Patent is hereby corrected as shown below:

At column 1, line 33, change "an exit" to ---and exit---.
At column 1, line 50, change "possible" to ---possibly---.
At column 9, line 68, change "is" to ---in---.
At column 13, line 3 (claim 12, line 1), change "hype" to ---type---.

Signed and Sealed this

Fifteenth Day of August, 1995

Attest:

BRUCE LEHMAN

Attesting Officer  Commissioner of Patents and Trademarks